(12) United States Patent
Ronciak et al.

(10) Patent No.: US 7,944,828 B2
(45) Date of Patent: May 17, 2011

(54) DYNAMICALLY ASSIGNING PACKET FLOWS

(75) Inventors: John Ronciak, Beaverton, OR (US); Christopher Leech, Portland, OR (US); Prafulla Deuskar, Hilsboro, OR (US); Jesse Brandeburg, Portland, OR (US); Patrick Connor, Portland, OR (US)

(73) Assignee: Intel Corporation, Santa Clara, CA (US)

(*) Notice: Subject to any disclaimer, the term of this patent is extended or adjusted under 35 U.S.C. 154(b) by 7 days.

(21) Appl. No.: 12/587,045

(22) Filed: Oct. 1, 2009

(65) Prior Publication Data

US 2010/0091774 A1 Apr. 15, 2010

Related U.S. Application Data

(63) Continuation of application No. 10/957,001, filed on Sep. 30, 2004, now Pat. No. 7,620,046.

(51) Int. Cl.
*G01R 31/08* (2006.01)

(52) U.S. Cl. ............... 370/230; 370/230.1; 370/235; 370/392

(58) Field of Classification Search ................ 370/392, 370/394, 400, 412, 429, 229, 230, 230.1, 370/235, 389
See application file for complete search history.

(56) References Cited

U.S. PATENT DOCUMENTS

| | | | |
|---|---|---|---|
| 6,389,468 B1 | 5/2002 | Muller et al. | |
| 6,453,360 B1 | 9/2002 | Muller et al. | |
| 6,483,804 B1 | 11/2002 | Muller et al. | |
| 6,484,209 B1 * | 11/2002 | Momirov | 709/238 |
| 6,650,640 B1 | 11/2003 | Muller et al. | |
| 6,683,873 B1 | 1/2004 | Kwok et al. | |
| 6,973,040 B1 | 12/2005 | Ricciulli | |
| 7,043,494 B1 | 5/2006 | Joshi et al. | |
| 7,162,740 B2 | 1/2007 | Eastlake, III | |
| 7,219,228 B2 | 5/2007 | Lin | |
| 2002/0144004 A1 | 10/2002 | Gaur et al. | |
| 2003/0043810 A1 * | 3/2003 | Boduch et al. | 370/395.1 |
| 2003/0226032 A1 | 12/2003 | Robert | |
| 2004/0030757 A1 | 2/2004 | Pandya | |

FOREIGN PATENT DOCUMENTS

EP 1367799 A2 12/2003

OTHER PUBLICATIONS

"Scalable Networking: Eliminating the Receive Processing Bottleneck—Introducing RSS", WinHEC 2004 Version, Apr. 14, 2004, 17 Pages.

International Preliminary Report on Patentability (Chapter I of the Patent Cooperation Treaty), for PCT Application No. PCT/US2005/044771, mailed on Jun. 28, 2007, 8 pages.

Johnathan Lemon; "Resisting SYN Flood DoS Attacks with a SNY Cache"; USENIX Association; Berkley, CA; 2002; pp. 89-97; ISBN: 1-880446-02-2, 2000.

(Continued)

*Primary Examiner* — Jung Park (57) ABSTRACT

In general, in one aspect, the disclosure describes a method includes accessing data of an egress packet belonging to a flow, storing data associating the flow with at least one queue based on a source of the data of the egress packet. The method also includes accessing an ingress packet belonging to the flow, performing a lookup of the at least one queue associated with the flow, and enqueueing data of the ingress packet to the at least one queue associated with the flow.

4 Claims, 6 Drawing Sheets

OTHER PUBLICATIONS

Technology at Harvard Law; "RSS 2.0 Specification"; pp. 10; Jul. 15, 2003; last accessed Feb. 5, 2008: http://cyber.law.harvard.edu/rss/rss.html.

Janice M. Girouard, "patch for common networking error messages", Jun. 16, 2003, http://oss.sgi.com/archives/netdev/2003-06/msg00474.html.

"Re: [review please] tcp syn cache clean up code for sc->sc_so"; Aug. 21, 1999; pp. 1; last accessed Feb. 5, 2008: http://mail-index.netbsd.org/tech-net/1999/08/21/0001.html.

Kenneth D. Merry; "Zero Copy Sockets and NFS Code for FreeBSD"; Jun. 16, 2000; pp. 7; last accessed Feb. 5, 2008: http://www.mail-archive.com/freebsd-current@freebsd.org/msg17038.html.

Steenbergen: Understanding Modern Denial of Service 2001, 10 pages.

Reutsche: The Architecture of a Gb/s Multimedia Protocol Adapter, Computer Communication Review ACM SIGCOMM, vol. 23, No. 3, Jul. 1993, pp. 59-68.

Intel IXP2400 Network Processor hardware Reference Manual, Nov. 2003, 408 pages.

DAEMON9: Project Neptune, Phrack Magazine, vol. 7, Issue 48, file 13 of Jul. 18, 1996, 23 pages.

Lemon: Resisting SYN Flood Dos Atacks with a SYN Cache, FreeBSD Project, 9 pages, 2000.

FreeBSD/Linux Kernel Cross Reference sys/netinet/tcp_syncache.c, 2001 Networks Associates Technology, Inc., 24 pages.

FreeBSD/Linux Kernel Cross Reference sys/netinet/tcp_syncache.c, 2001 Networks Associates Technology, Inc., 25 pages.

FreeBSD/Linux Kernel Cross Reference sys/sys/queue.h, 1991, 1993, The Regents of the University of California, 10 pages.

Addressing TCP/IP Processing Challenges Using the IA and IXP Processors, Communications Processing, Intel Technology Journal, vol. 7, Issue 4, Nov. 14, 2003, pp. 39-50.

Sapuntzakis et al.: The Case for RDMA; Cisco Systems, Dec. 2000, 13 pages.

Technology at Havard Law; RSS 2.0 Specification; http://blogs.law.harvard.edu/tech/rss; 10 pages, 2003.

Miller & Girouard: Patch for Common Networking Error Messages; linux.kernel; Jun. 17, 2003; blog.

Thorpe: tcp syn cache cleanup code for sc->sc_so; Aug. 21, 1999; 1 page.

Merry Zero Copy Sockets and NFS Code for Free BSD; sol.lists.freebsd.net; 7 pages; blog 2000.

International Search Report and Written Opinion for PCT Application No. PCT/US2005/044771, Mailed on May 8, 2006, 21 Pages.

* cited by examiner

DYNAMICALLY ASSIGNING PACKET FLOWS

This application claims priority to and is a continuation of U.S. patent application Ser. No. 10/957,001, U.S. Pat. No. 7,620,046, entitled "DYNAMICALLY ASSIGNING PACKET FLOWS", filed on Sep. 30, 2004, which is incorporated by reference in its entirety herein.

BACKGROUND

Networks enable computers and other devices to communicate. For example, networks can carry data representing video, audio, e-mail, and so forth. Typically, data sent across a network is carried by smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately.

A number of network protocols cooperate to handle the complexity of network communication. For example, a transport protocol known as Transmission Control Protocol (TCP) provides "connection" services that enable remote applications to communicate. TCP provides applications with simple mechanisms for establishing a connection and transferring data across a network. Behind the scenes, TCP transparently handles a variety of communication issues such as data retransmission, adapting to network traffic congestion, and so forth.

To provide these services, TCP operates on packets known as segments. Generally, a TCP segment travels across a network within ("encapsulated" by) a larger packet such as an Internet Protocol (IP) datagram. Frequently, an IP datagram is further encapsulated by an even larger packet such as an Ethernet frame. The payload of a TCP segment carries a portion of a stream of data sent across a network by an application. A receiver can restore the original stream of data by reassembling the received segments. To permit reassembly and acknowledgment (ACK) of received data back to the sender, TCP associates a sequence number with each payload byte.

Many computer systems and other devices feature host processors (e.g., general purpose Central Processing Units (CPUs)) that handle a wide variety of computing tasks. Often these tasks include handling network traffic such as TCP/IP connections. The increases in network traffic and connection speeds have placed growing demands on host processor resources. To at least partially alleviate this burden, some have developed TCP Off-load Engines (TOEs) dedicated to off-loading TCP protocol operations from the host processor (s).

DETAILED DESCRIPTION

As described above, increases in network traffic and connection speeds have increased the burden of packet processing on host systems. In short, more packets need to be processed in less time. Fortunately, processor speeds have continued to increase, partially absorbing these increased demands. Improvements in the speed of memory, however, have generally failed to keep pace. Each memory operation performed during packet processing represents a potential delay as a processor waits for the memory operation to complete. For example, in Transmission Control Protocol (TCP), the state of each connection is stored in a block of data known as a TCP control block (TCB). Many TCP operations require access to a connection's TCB. Frequent memory accesses to retrieve TCBs can substantially degrade system performance. One way to improve system performance is to keep TCB and other connection related data in a processor cache that stores a quickly accessible copy of data. In a multi-processor system, however, the TCB of a connection may, potentially, be accessed by different processors. Efforts to maintain consistency in the TCB data (e.g., cache invalidation and locking) while the different agents vie for access may undermine the efficiency of caching.

Figure 1A:
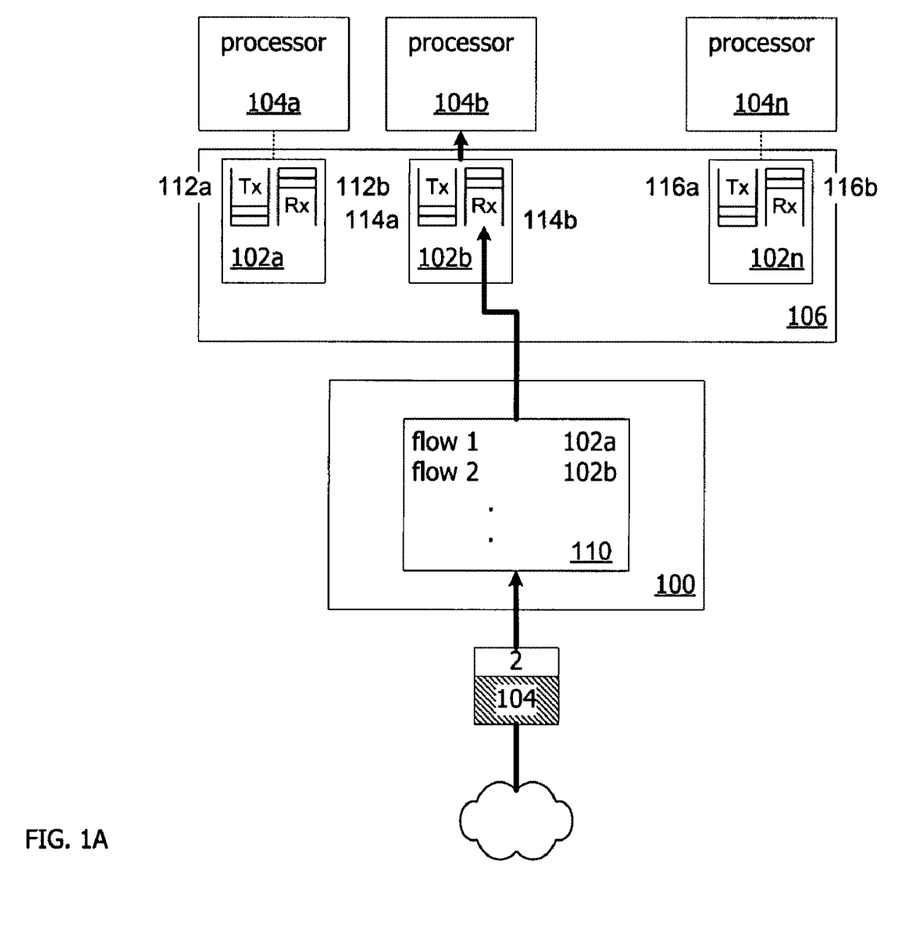
FIGS. 1A-1C illustrate assignment of packet flows.

FIG. 1A shows a system that delivers received packets belonging to the same flow to the same destination. This increases the likelihood that flow-related data for a given flow will remain in cache.

In greater detail, the system of FIG. 1A features multiple processors 104a-104n that share access to a network interface controller 100 (a.k.a. network adaptor). The controller 100 provides access to communications media (e.g., a cable and/ or wireless radio). The controller 100 handles transmission of egress packets out to the network via the communications media and, in the other direction, handles ingress packets received from the network.

The processors 104a-104n exchange data with the controller 100 via queues 112a, 112b, 114a, 114b, 116a, 116b. For example, in FIG. 1A, each processor 104a-104n has an associated queue pair 102a-102n that features a transmit queue (Tx) and a receive queue (Rx) pair. For instance, to transmit packet data out of the host, processor 104a can enqueue the packet data in transmit queue 112a in queue pair 102a associated with the processor 104a. The enqueued data is subsequently transferred to the controller 100 for transmission. Similarly, the controller 100 delivers received packet data by enqueuing packet data in a receive queue, e.g., 112b.

As indicated above, packets often form part of a packet flow. For example, a series of Asynchronous Transfer Mode (ATM) cells may travel within an ATM virtual circuit. Similarly, a collection of TCP segments may travel within a TCP connection. A given flow can be identified by a collection of information in a packet's header(s). For example, the flow of a TCP/IP packet can be identified by a combination of, at least, the packet's IP source and destination addresses, source and destination ports, and a protocol identifier (a.k.a. a TCP/ IP tuple). Likewise, for an IPv6 or ATM packet, the flow may be identified by a flow identifier field.

As shown, to determine where to enqueue a received packet, the controller 100 accesses data 110 that associates a packet flow (arbitrarily labeled "flow 1" and "flow 2") with a destination (e.g., a processor, queue pair, and/or queue). For example, as shown in FIG. 1A, after receiving a packet 104, the controller 100 can identify a flow identifier for the packet 104 (e.g., by hashing the TCP/IP tuple). The controller 100 can use the flow identifier to lookup a destination for packets in the flow in data 110. As shown, the packet 104 belongs to flow "2" which is associated with queue pair 102b. Based on this lookup, the controller 100 enqueues the packet 104 to the receive queue 114b in the queue pair 102b, for example, by performing a Direct Memory Access (DMA) of the packet 104 into a memory 106 location in the queue specified by a driver operating on processor 104*b*.

The data 110 used to identify where to deliver received packets can be set by a driver operating on the processors 104*a*-104*n*. For example, the processors 104*a*-104*n* can send configuration messages to the controller 100 indicating the destinations for different flows. These configuration messages, however, can consume significant bandwidth between the processors 104*a*-104*n* and the controller 100. Additionally, these configuration messages represent an on-going traffic burden as connections are created and destroyed, and as flows are redirected to different destinations.

Figure 1B:
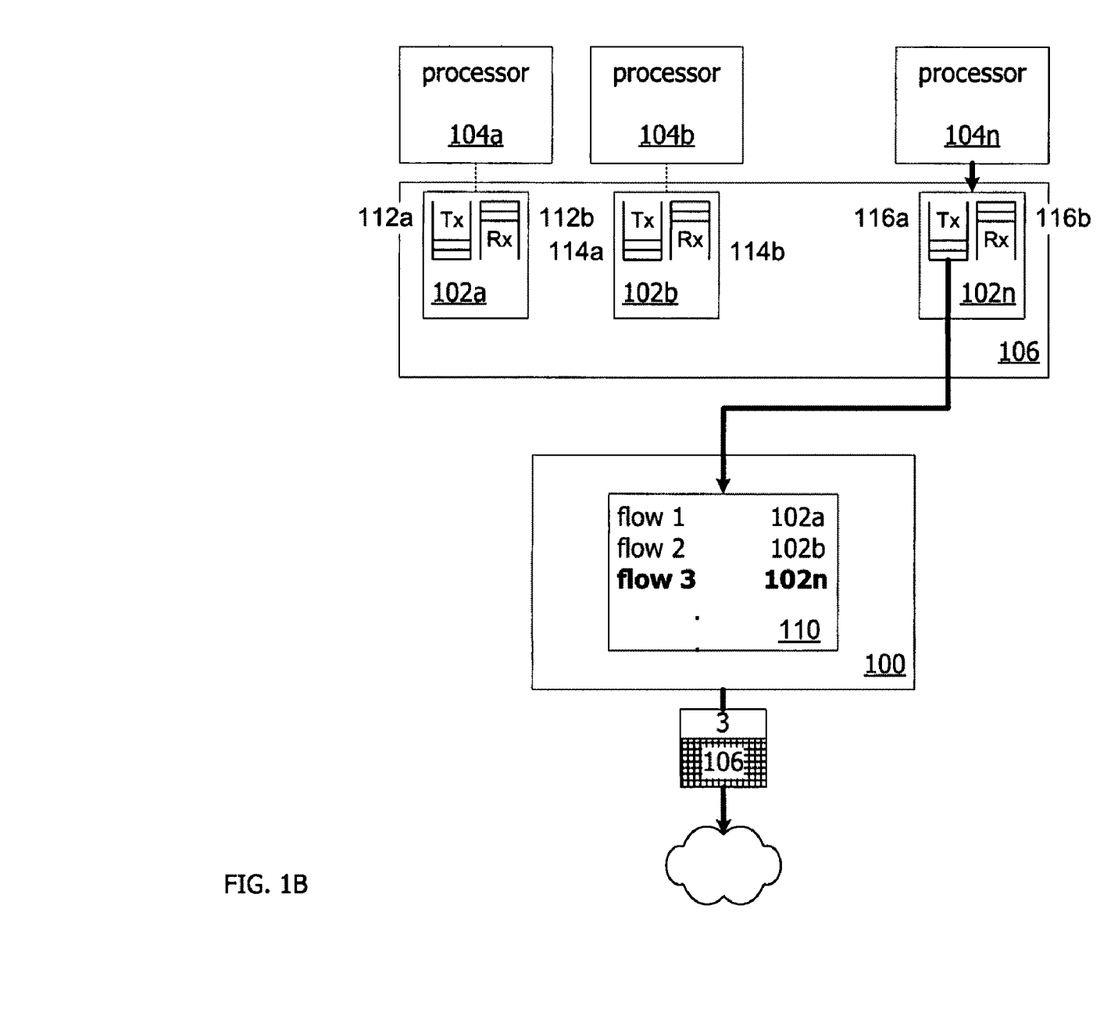
Figure 1C:
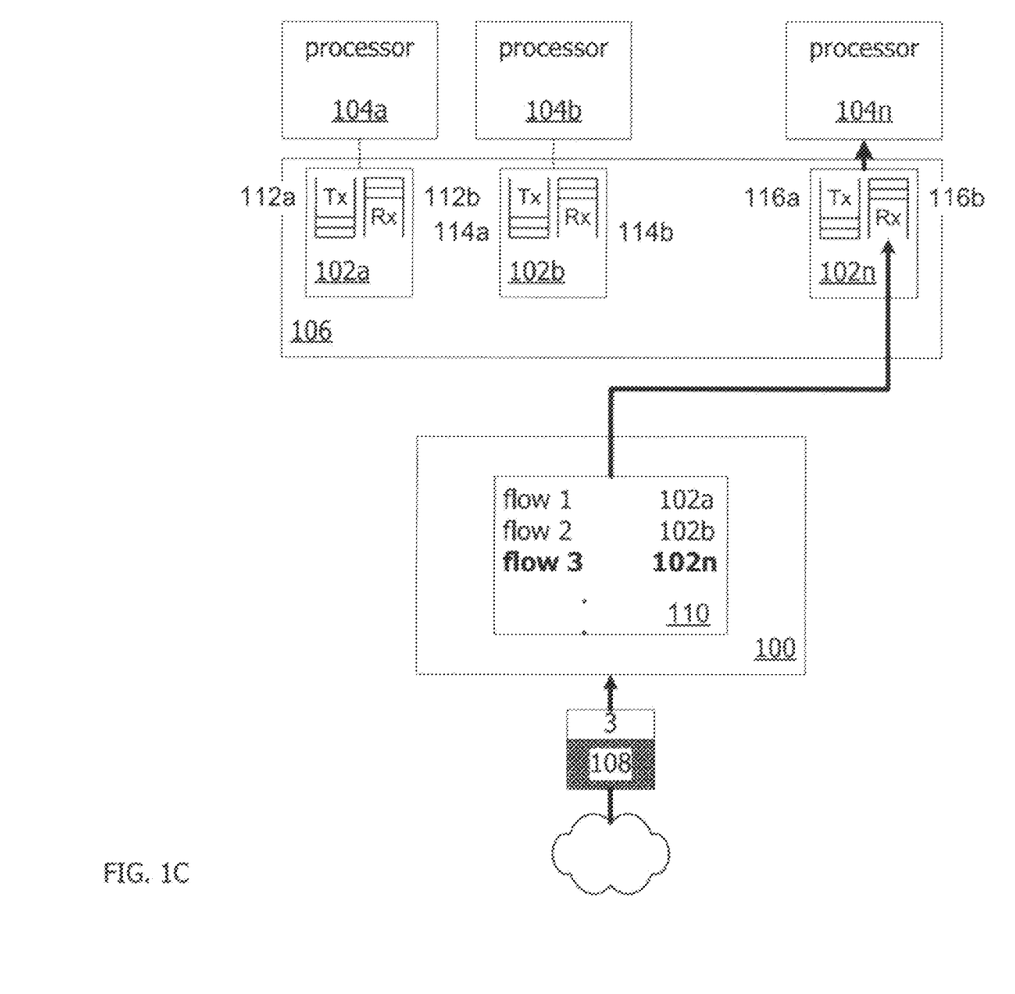

FIG. 1B depicts a technique that enables the controller 100 to learn how to direct ingress packets by identifying the sources of an egress packets. For example, as shown in FIG. 1B, processor 104*n* enqueues egress packet data in a transmit queue 116*b* associated with the processor 104*n*. As shown, the network interface controller 100 receives the packet data, for example, after receiving a packet descriptor identifying the location of the packet data in memory 100. The descriptor or other data can identify the source (e.g., a transmit queue, queue pair, and/or processor) of the egress packet data. In the case shown, the egress packet data belongs to flow "3" and has a source of queue pair 102*n*. Thus, the controller 100 updates its data 110 to direct ingress packets that are part of flow "3" to the receive queue 116*b* of the same queue pair 102*n*. This updating may include modifying previously existing data for an on-going flow or adding a new entry for a flow that is just starting. As shown in FIG. 1C, a subsequently received ingress packet 108 belonging to flow "3" is routed to the same queue pair 102*n* used in transferring the egress packet data for flow "3" to the controller 100.

The technique illustrated above can greatly reduce and/or eliminate the amount of run-time configuration performed, decreasing bus traffic that may otherwise be used for configuration messages. Additionally, the technique quickly adapts to a changing environment. For example, if a TCP connection is assigned to a different processor and/or queue, this technique can begin routing packets to the new destination immediately after a packet was sent from the new source.

The system show in FIGS. 1A-1C is merely an example and a wide variety of variations and implementations can feature the techniques described above. For example, FIGS. 1A-1C depicted a single queue pair 102*a*-102*n* associated with each processor 104*a*-104*n*. However, in other implementations a processor 104 may have multiple associated queue pairs. For example, a processor 104 can implement a policy for assigning flows to many different transmit queues based on a variety of criteria (e.g., priority, flow, Virtual Local Area Network (VLAN) identifier, and so forth). Since the controller 100 mirrors the directing of ingress packets based on the host source of egress packets, the controller 100 can correctly deliver ingress packets in accordance with a given policy being implemented by a processor without explicit programming of the policy. This permits the policies being used to be easily and instantly altered without controller modification.

Additionally, though the queues shown in FIGS. 1A-1C were exclusively associated with a single processor, a given queue need not be exclusively associated with a single processor. For example, a queue pair may service multiple processors.

Figure 2:
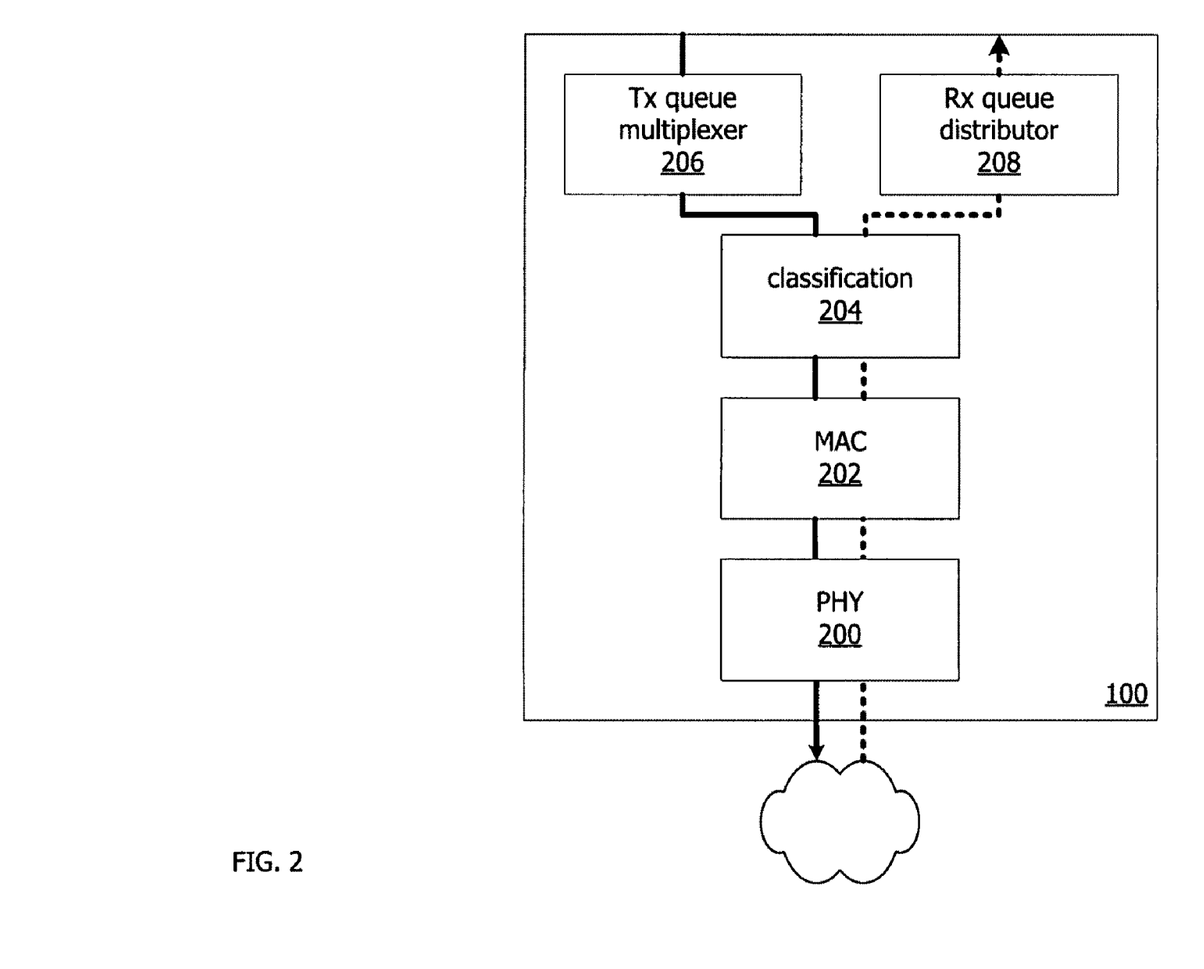
FIG. 2 is a diagram of a network interface controller.

FIG. 2 illustrates a sample network interface controller 100 implementing techniques described above. In this illustration, the solid line denotes the transmit (Tx) path traveled by egress packet data and the dashed line denotes the receive (Rx) path traveled by ingress packet data.

As shown, the controller 100 features a physical layer device 200 that translates between the signals of a physical communications medium (e.g., electrical signals of a cable or radio signals of a wireless connection) and digital bits. The PHY 200 is coupled to a media access controller (MAC) that performs layer 2 operations such as encapsulating/de-encapsulation of TCP/IP packets within Ethernet frames and computing checksums to verify correct transmission. The MAC 200 is coupled to a classification engine 204 (e.g., an Application-Specific Integrated Circuit (ASIC) and/or a programmable processor). The classification engine 204 can perform tasks described above. Namely, for ingress packets, the engine 204 can match a packet to a flow and forward the packet to the associated destination queue. For egress packet data, the engine 204 can identify the flow of an out-bound data, identify the source of the packet (e.g., the transmit queue, queue pair, and/or processor), and update its flow/destination mapping to deliver subsequently received packets in the flow based on the source.

As shown in FIG. 2, the controller 100 features a receive queue distributor 208. The distributor 208 can DMA ingress packet data to the receive queue in memory identified by the classification engine 204. For example, the controller 100 may receive pointers to packet descriptors in memory from a controller driver operating on one or more of the processors. The packet descriptors, in turn, reference entries in the different receive queues 112*b*, 114*b*, 116*b* the controller 100 can use to enqueue the ingress packet data. After accessing a packet descriptor for the desired receive queue 112*b*, 114*b*, 116*b*, the controller 100 can use Direct Memory Access (DMA) to enqueue the received ingress packet data. These descriptors are recycled by the driver for reuse after dequeueing of the data by processors 104*a*-104*n*.

As shown, the controller 100 also features a transmit queue multiplexer 206 that dequeues entries of egress packet data from the different transmit queues. The multiplexer 206 can access packet descriptors identified by driver software that identify the next packet to retrieve from a transmit queue. Based on the descriptor, the multiplexer 206 can perform a DMA of the enqueued egress packet data to the controller 100 for subsequent transmission to the network (e.g., via the MAC 202 and PHY 200). Instead of relying on packet descriptors, the multiplexer 206 can instead independently consume transmit queue entries, for example, by performing a round-robin among the transmit queues and/or implementing a priority scheme.

Again, the controller implementation shown in FIG. 2 is merely an example. Other controllers can feature different designs and components.

Figure 3:
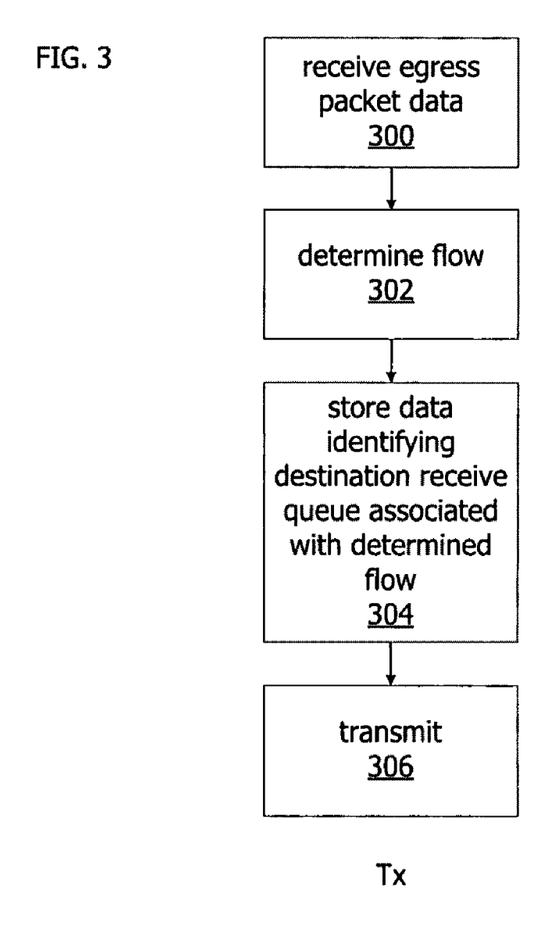
FIGS. 3 and 4 are flow-charts of packet receive and transmit operations.

FIG. 3 illustrates a sample transmit process implemented by a controller to handle egress packets. As shown, the controller determines 302 a flow that an ingress packet data received 300 from the network belongs to. Based on the determined flow, the process may store 304 data identifying a destination for received ingress packets in the flow. The process also transmits 306 the egress packet.

Figure 4:
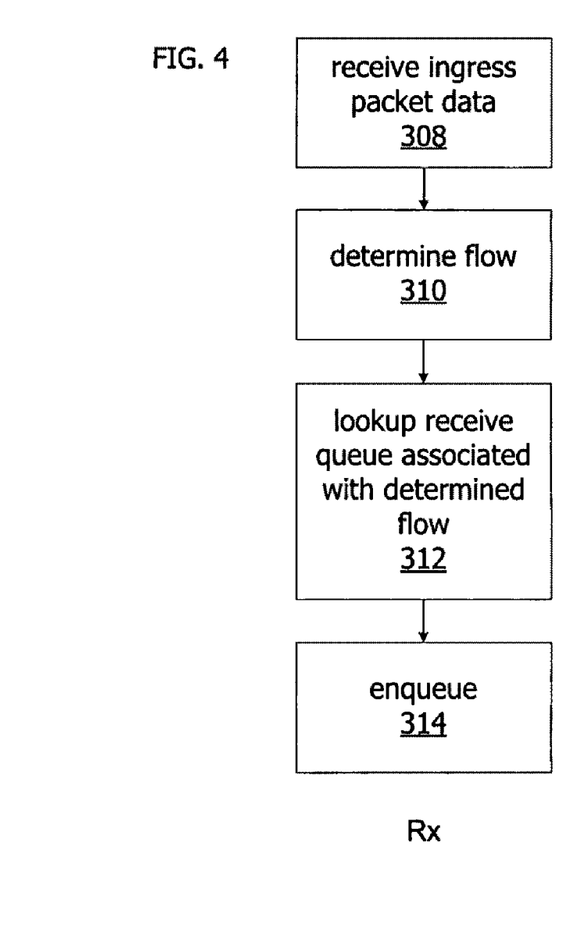

FIG. 4 illustrates a sample receive process implemented by a controller to handle ingress packets. In the process, the controller determines 310 the flow associated with an ingress packet received 308 over a communications network. The process performs a lookup 312 of the flow to determine the destination associated with the flow and enqueues 314 the received ingress packet in the determined destination queue.

Figure 5:
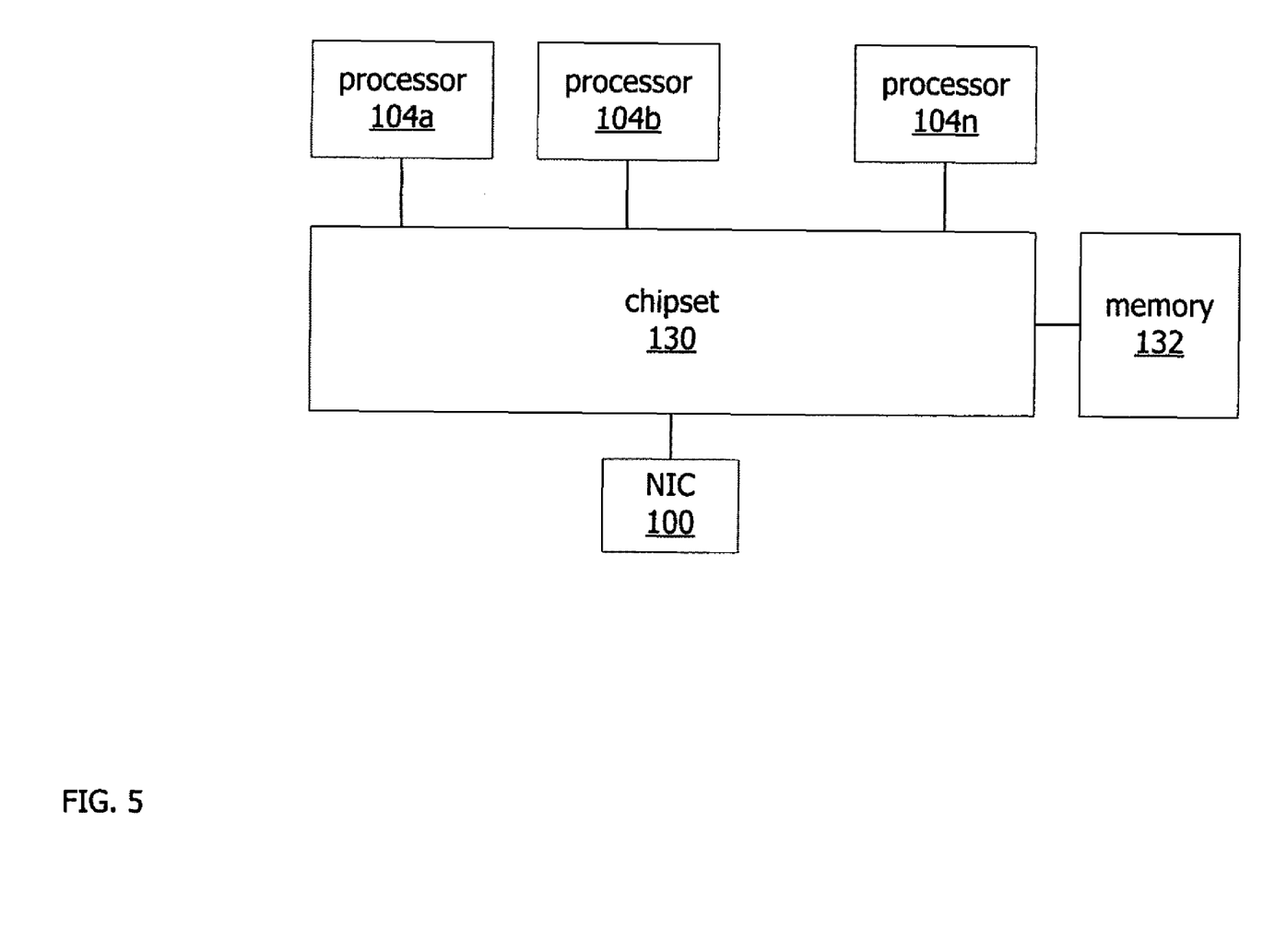
FIG. 5 is a diagram of a computer system.

FIG. 5 depicts a computer system that can implement the techniques described above. As shown, the system features multiple processors 104*a*-104*n*. The processors 104*a*-104*n* may be Central Processor Units (CPUs), a collection of programmable processor cores integrated within the same die, and so forth. The processors 104a-104n are coupled to a chipset 130. The chipset 130 provides access to memory 132 (e.g., randomly accessible memory) and at least one network interface controller 100, for example, by providing an Input/Output (I/O) controller hub. The chipset 130 may also feature other circuitry such as a graphics card.

The system shown in FIG. 5 is merely exemplary and a wide variety of variations are possible. For example, instead of being a separate component, the controller may be integrated into the chipset 120 or a processor 104.

While the above described specific examples, the techniques may be implemented in a variety of architectures including processors and network devices having designs other than those shown. The term packet can apply to IP (Internet Protocol) datagrams, TCP (Transmission Control Protocol) segments, ATM (Asynchronous Transfer Mode) cells, Ethernet frames, among other protocol data units. Additionally, the above often referred to packet data instead of simply a packet. This reflects that a controller, or other component, may remove and/or add data to a packet as the packet data travels along the Rx or Tx path.

The term circuitry as used herein includes hardwired circuitry, digital circuitry, analog circuitry, programmable circuitry, and so forth. The programmable circuitry may operate on executable instructions disposed on an article of manufacture. For example, the instructions may be disposed on a Read-Only-Memory (ROM) such as a Programmable Read-Only-Memory (PROM)) or other medium such as a Compact Disk (CD) and other volatile or non-volatile storage.

Other embodiments are within the scope of the following claims.

What is claimed is:

1. A network controller interface, comprising:
    at least one interface to a media access controller to receive ingress packets from a network connection, respective received ingress packets belonging to respective Transmission Control Protocol/Internet Protocol flows identified by, at least, Transmission Control Protocol ports and Internet Protocol addresses of the respective packets;
    at least one interface to multiple respective processors;
    circuitry to:
        direct the received ingress packets to the multiple respective processors such that each of the Transmission Control Protocol/Internet Protocol flows maps to a single one of the multiple respective processors, wherein different flows map to different ones of the multiple respective processors, wherein the network interface controller directs the received ingress packets by accessing lookup data associating a respective flow with a respective one of the multiple respective processors; and
        receive an egress packet at the network interface controller from a transmitting one of the respective multiple processors for transmission via the network connection and, in response, store data in the lookup data associating the transmitting one of the respective multiple processors with a flow of the egress packet such that subsequently received ingress packets belonging to the flow are directed to the transmitting one of the respective multiple processors;
    wherein the circuitry comprises circuitry to hash at least the following data fields: the Internet Protocol source and destination addresses and the Transmission Control Protocol source and destination ports of the respective received ingress packets to yield a flow hash result; and
    wherein the lookup data associates flow hash results with respective ones of the multiple processors.

2. A method, comprising:
    receiving at least one interface of a network interface controller to a media access controller ingress packets, respective received ingress packets belonging to respective Transmission Control Protocol/Internet Protocol flows identified by, at least, Transmission Control Protocol ports and Internet Protocol addresses of the respective packets;
    directing, by the network interface controller, the received ingress packets to the multiple respective processors such that each of the Transmission Control Protocol/Internet Protocol flows maps to a single one of the multiple respective processors, wherein different flows map to different ones of the multiple respective processors, wherein the network interface controller directs the received ingress packets by accessing lookup data associating a respective flow with a respective one of the multiple respective processors; and
    receiving an egress packet at the network interface controller from a transmitting one of the respective multiple processors for transmission via the network connection and, in response, store data in the lookup data associating the transmitting one of the respective multiple processors with a flow of the egress packet such that subsequently received ingress packets belonging to the flow are directed to the transmitting one of the respective multiple processors;
    hashing at least the following data fields: the Internet Protocol source and destination addresses and the Transmission Control Protocol source and destination ports of the respective received ingress packets to yield a flow hash result; and
    wherein the lookup data associates flow hash results with respective ones of the multiple processors.

3. The network controller interface of claim 1, wherein the lookup data that associates flow hash results with respective ones of the multiple processors comprises data that associates respective flow hash results with respective queues associated with the respective multiple processors.

4. The method of claim 2, wherein the lookup data that associates flow hash results with respective ones of the multiple processors comprises data that associates respective flow hash results with respective queues associated with the respective multiple processors.

* * * * *